Nov. 13, 1962   M. L. OBITTS   3,063,083
WASH KIT FOR CONTACT LENSES AND THE LIKE
Filed July 12, 1960
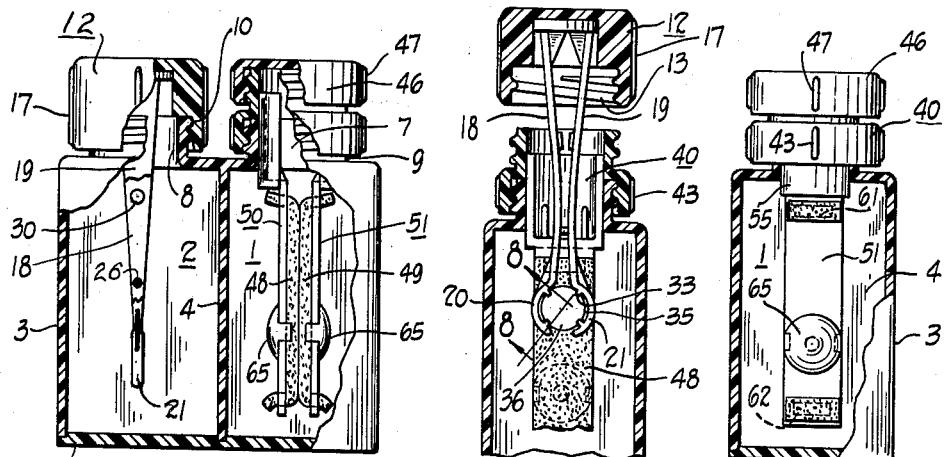
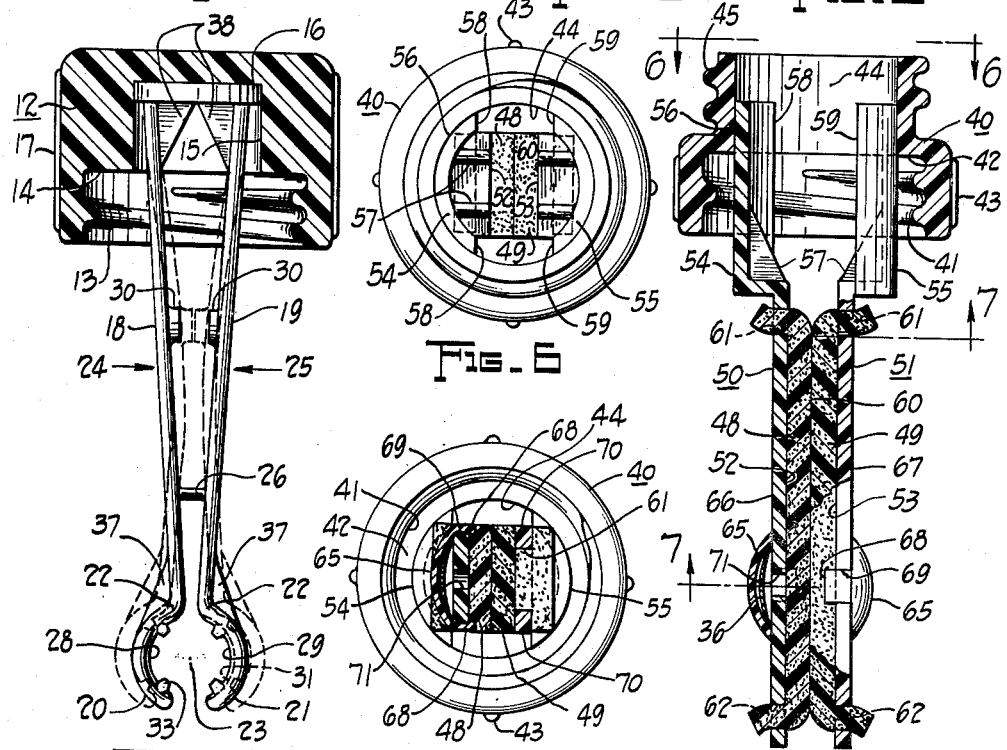
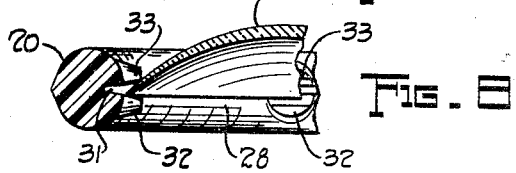
INVENTOR.
MILTON L. OBITTS
BY Bosworth, Sessions,
Herrstrom and Knowles
ATTORNEYS.

United States Patent Office 3,063,083
Patented Nov. 13, 1962

3,063,083
WASH KIT FOR CONTACT LENSES AND THE LIKE
Milton L. Obitts, Box 253, La Grange, Ohio
Filed July 12, 1960, Ser. No. 42,345
34 Claims. (Cl. 15—512)

This invention relates to washing devices, more particularly to a kit for washing and storing opthalmological appliances known as contact lenses. Sight improving appliances of the contact lens type are worn directly against the eyeball and are necessarily small and light in weight. Made of transparent material such as glass or plastic, they are handled with difficulty and are prone to get lost or mislaid. Many individuals prefer not to wear them continuously and therefore have the problem of finding a suitable facility for storing and safe keeping such lenses. Moreover, such lenses must be sterile and optically clean, free of dirt, dust, grit, oil and chemical film likely to injure or irritate the eye or impair optical qualities or light transmission.

The principal object of the invention is, therefore, to provide suitable means for safely storing contact lenses, for cleansing such lenses and for handling them in washing operations and inspections. The invention contemplates the provision of such means in a unitized kit which takes the form of a receptacle having a chamber which contains a cleansing solution; the receptacle preferably, but not necessarily, has another chamber which contains a rinsing solution. Such receptacle is provided with openings into the chambers, the opening into the rinsing solution chamber being closed by a sealing cap which carries a holder in the form of a tongs adapted to grip a lens by its periphery; the chamber for the cleansing solution accommodating a scrubber assembly partially immersed in such solution. Inserting the tongs and a lens carried thereby through the receptacle opening into the cleansing chamber moves the lens through a washway provided by the scrubber and against soft resilient material immersed in and wetted by the solution to thereby sweep or dissolve off any foreign matter and cleanse the lens in a gentle wiping action; after such cleansing of the lens the tongs is withdrawn and the lens, still held by the tongs, is rinsed by immersion in the rinsing solution. Thereafter, the lens is removed from the tongs and placed in use, the tongs being returned to the rinsing chamber with the opening into the latter sealed by the cap which carries the tongs. The cleansing chamber is sealed by a separate cap without removing the scrubber assembly.

In a more specialized version and as a further objective the invention provides encapsulating storage means for contact lenses. According to a preferred arrangement, the storage means takes the form of one or more cups each of sufficient capacity to contain one or more of the lenses, the cup or cups being attachable by interfitting snap-fit formations to either or both the carrier tongs and the scrubber assembly.

Another object is to provide an improved lens holder in the form of a tongs made of resilient deformable material, the holder being designed for economical manufacture as by injection molding of synthetic stiff, shape retaining but resilient plastic material. More particularly, this aspect of the invention is concerned with a lens holder comprising suitable leg means adapted to be secured to the inside of a closure cap for a receptacle of the character described so as to extend downwardly through the neck of the opening into the receptacle. The holder tongs is thus insertable into the chamber as desired and is positioned therein when the cap is sealingly applied to the receptacle neck. According to a specialized version of the invention, the carrier tongs comprises a pair of legs which project from spaced anchorages in the cap in side by side generally converging relation; the extremities or distal ends of the legs are in the form of arcuately curved holding portions disposed with their concave sides confronting one another in a common plane. A fulcrum is provided between the legs adjacent their holding portions so that squeezing the legs together at a point spaced toward the cap from the fulcrum causes the holding portions to be spread apart for receiving a lens between them. In a preferred structural arrangement the base ends of the legs are anchored in the cap at spaced apart points by being integrally joined to a common flat circular base normal to the longitudinal axis of the tongs.

Another object is to provide a lens holding tongs of the character mentioned which has the arcuately curved gripping portions disposed to define and surround a lens receiving zone, such gripping portions having radially inwardly projecting protuberances adapted to engage circumferentially spaced portions of the lens in supporting relation and to space the gripping portions radially outwardly from the lens with a substantially continuous circumferentially extending clearance between the tongs and a lens gripped thereby.

Another object is to provide a lens scrubber device of the character referred to which is insertable into and attachable to the neck of a bottle or other receptacle having a chamber containing a lens cleansing solution. The invention contemplates such a scrubber comprising a body member for support on, as by attachment to, the bottle neck and rigid frame means including a member or members extending from the body into the receptacle, the frame means carrying suitable relatively soft deformable washing means for engagement with a lens inserted into the chamber of the cleansing receptacle. Cleansing action thus takes place with both the scrubber and the lens submerged in the cleansing liquid. In a specialized version of the scrubber, the frame means comprises a pair of spaced generally parallel members upon the confronting faces of which are mounted suitable washer means in the form of sponges or synthetic foam such as a polyurethane material not subject to chemical attack by the liquid cleansing solution used. The opposed elements of the washer means define a washway or path for an inserted lens and normally contact one another, are necessarily deformed by the forcing of a lens between them in the lens cleaning operation. The soft washer elements thus guide the lens yieldingly in the washway, the lens being moved to and fro in the scrubber by suitable manipulation of the lens holder.

Other objects and advantages are contemplated including those concerned with features of construction and combinations and arrangements of parts, as will become apparent from the following detailed description of a preferred embodiment representing the best known mode of practicing the invention. This description is made in connection with the accompanying drawings forming a part of the specification.

In the drawings:

FIG. 1 is a side elevational view, partly in section and with parts broken away and removed showing a lens washing kit of the character referred to comprising a receptacle having separate chambers for washing and rinsing solutions, a holder tongs carried in the rinsing chamber by the sealing cap for such chamber and a scrubber assembly supported on the neck which defines the opening into the washing chamber, sealing of the latter being effected by a separate cap;

FIG. 2 is an elevational view of the right hand end of the kit of FIG. 1, partly in section and with parts broken away and removed to show the interior of the washing chamber;

FIG. 3 is a vertical sectional detail showing the insertion of the lens holder tongs into the scrubber to draw a lens carried by the tongs to and fro in the washway;

FIG. 4 is an elevational view of the lens holder, partly in section, and enlarged with respect to the preceding figures;

FIG. 5 is an elevational view of the scrubber assembly, partly in section and with parts broken away and removed, this view being enlarged with respect to FIGS. 1–3, substantially to the same scale as FIG. 4;

FIG. 6 is a top plan view of the scrubber assembly taken substantially in the plane represented by the line 6—6 of FIG. 5;

FIG. 7 is a sectional detail taken substantially along the broken line 7—7 of FIG. 5; and FIG. 8 is a sectional detail showing the gripping of a lens by the holding portions of the tongs, this view being taken substantially along the line indicated at 8—8 of FIG. 3, and enlarged with respect thereto.

The kit of the present invention provides washing and rinsing chambers 1, 2 in a suitable receptacle 3 formed as by injection molding of a suitable synthetic plastic material such as a styrene compound or methyl methacrylate. The chambers are defined by an internal integral partition or divider 4; the receptacle has a separately molded bottom 5 suitably grooved and rabbeted to receive the lower edges of the walls and the partition which are cemented in place. Access openings or passages 7, 8 into the separate chambers 1, 2 are defined by necks 9, for the scrubber, 10, for the lens holder, formed on the receptacle 3 in the molding operation. The necks are formed with smooth internal surfaces, substantially cylindrical, and with spiral external threads. In plan form the receptacle 3 is generally rectangular, with smoothly rounded corners, each of the chambers 1 and 2 being substantially square in cross section. However, the particular shape of the receptacle is not critical; it may be round, oval or hour-glass shape in plan form, if desired. Moreover, the washing and rinsing chambers 1, 2 may be provided in separate receptacles, the partition may be omitted, the receptacle having thus but a single chamber containing a single solution but having the two necks for the scrubber and the lens holder.

As shown to advantage in FIG. 4 the lens holder comprises a cap 12 and a tongs fast thereto. The cap has external gripping ribs 17 and is formed with internal threads 13 adapted to mate with the threads on the stem 10 in attaching the cap over the opening into the rinsing chamber in sealing relation. The cap is molded of a suitable impact resistant synthetic plastic which may be the same as that used for the tongs described later herein. An internal radial shoulder 14, completely circular in extent, engages the circular end of the receptacle neck 10 in the provision of a fluid-tight seal; a deformable gasket or washer, not shown, may be interposed, if desired. A cylindrically walled socket 15 in the cap 12 receives circular base 16 of a one-piece carrier tongs formed by injection molding of suitable plastic material such, for example, as high impact polystyrene modified for resiliency and toughness by a small percentage of GRS or similar rubber, polypropylene, polyvinylchloride, or a nylon such as a condensation product of adipic acid and hexamethylene diamine. A pair of legs 18, 19 project from diametrically opposite points of the base 16 in spaced, generally converging side by side relation. The base or near ends of the legs are thus integral with the base and are held fast thereby in predetermined fixed spaced apart relation to one another. The remote or distal ends of the legs 18, 19 are formed with arcuately curved holding portions 20, 21 disposed in a common plane and with concave sides in confronting relation. Each holding portion is connected integrally to the leg by which it is carried by a sharply angled joint 22 so that the arcuate lens gripping holding portions, in the unstressed condition of the tongs, lie on a common circle. Thus these gripping portions, comprising the distal ends of the legs of the tongs, are first divergent and then convergent to define a protectively surrounded lens receiving zone the center of which is indicated at 23. The angle joints 22 where the gripper ends 20, 21 are attached to hte legs 18, 19 are reinforced by webs 37 integrally molded in place.

When the legs 18, 19 are squeezed together as by pinching them between thumb and forefinger to apply opposed forces in the direction of arrows 24, 25 at points located intermediate their near or base ends and a fulcrum post 26, the legs each swing about the fulcrum as from the solid line position to the broken line position of FIG. 4; such movement of the legs spreads apart their distal or gripping ends to increase the size of the lens receiving zone so that a lens may be placed between confronting arcuate surfaces 28, 29 of the distal end grippers 20, 21. To avoid excessive bending of the tongs the legs 18, 19 are formed with one or more pads or bumper bosses 30 which may be formed wholly on one of the legs so as to engage the other or, as shown, in pairs, one on each of the legs to come together as stops. A number of such pads or bumpers or pairs thereof may be formed in spaced relation along the legs of the tongs without objectionably interfering with the desired flexibility and resiliency of the device. When the squeezing pressure is released, the tongs return by inherent resiliency to the normal or unstressed shape are represented by the full lines of FIG. 4. The gripper ends 20, 21 lie in a common plane which also contains the longitudinal axis of the tongs; moreover, when the tongs are actuated by applying opposite pressures along the lines indicated by the arrows 24, 25, the gripper ends are caused to move from and to each other in the same plane. The gripper portions 20, 21 thus move toward one another so as closely to surround the periphery of a lens disposed between them, the grippers and the periphery of a lens so received are in parallel relation, or substantially so. The gripper portions 20, 21 are each formed with suitable means such as an inside circumferential groove 31 or protuberances 32, 33 or both groove and protuberances, as shown, for effecting an interlocking relation between the lens periphery and each gripper.

The carrier tongs is so proportioned that in its normal or unstressed condition the distance across the lens receiving zone between the gripper ends 20, 21 is slightly less than the diameter or transverse dimension of the contact lens of the type with which the tongs is intended to be used. Thus, when the gripper ends are spread apart or distended, as described, and then released to engage a lens positioned in the lens receiving zone, the gripper ends are held apart by the lens, displaced from their normal positions relative to one another and the tongs is held by the lens in stressed condition, as shown to advantage in FIG. 3. The radial protuberances 32, 33 are arranged in pairs spaced circumferentially about the periphery of the lens so that the lens is contacted solely at a number of distributed points; the protuberances 32 engage one side of the lens at or adjacent its periphery while the protuberances 33 engage the other side of the lens also at or adjacent its periphery. Thus each pair of protuberances constitutes a stand-off support which spaces the lens periphery away from the faces 28, 29 of the grippers 20, 21. In this manner the periphery of the secured lens is separated from the gripper ends by arcuate clearance spaces 35 (FIG. 3). If the protuberances 32, 33 are omitted, or if the lens is so shaped so as not to be engaged by the protuberances, the lens periphery is engaged in the grooves 31 of the gripper ends. In either case, the lens is located with its periphery in the plane of the gripper ends, substantially completely surrounded and protected by such gripper ends. The mode of operation of the tongs is such as to facilitate securing a lens while the latter is held between thumb and finger or while supported on a finger tip or in the palm of one's hand. Since the grippers 20, 21 move toward and away from one another in the plane of the lens periphery and are also relatively thin, it is easy to align the grippers with the edge of the lens. Thus picking up of a lens by the tongs can be accomplished by feel without any need for the user visually to observe the operation.

Although the fulcrum 26 may comprise a pair of opposed protuberances formed on the legs 18, 19 of the tongs and engageable with one another on the longitudinal axis of the tongs, it is advantageous to make the fulcrum in the form of a single relatively thin post of flexible plastic material having its two ends integrally connected to the legs 18, 19. For example, the fulcrum may be formed in the molding process by which the tongs is made. Thus when the gripper ends 20, 21 are engaged about the lens 36, the fulcrum is in tension and the gripping force is provided by the reaction of the legs 18, 19 to the strain to which they are subjected, as shown in FIG. 3.

The legs 18, 19 of the tongs, although substantially uniform in thickness from their near ends at the base 16 to their distal ends (see FIGS. 3, 4) are tapered in width (see FIG. 1) being wide adjacent the base 16 and relatively narrow at their distal ends. Thus each leg progressively decreases in cross section from its near to its distal end. The integral connection of the relatively wide near ends of the legs to the base 16, augmented in rigidity by triangular fillets 38, strongly resists bending of the legs at their points of attachment to the base, providing cantilever beam action in the plane of the gripper ends 20, 21. Moreover, the relatively long line of connection of each leg to the circular base 16 and the integral fillet 38 prevents twisting of the leg relative to the base, thereby minimizing objectionable distortion of the tongs, especially the fulcrum rod 26 which is relatively thin compared to the legs 18, 19, and therefore, relatively fragile.

The scrubber assembly is carried by the neck 9 and extends through the opening 7 into the washing chamber 1; it comprises a tubular stepped diameter molded plastic body 40 having internal threads 41 molded in its larger lower end mating with the external threads of the receptacle stem 9. An internal radial shoulder 42 engages the end face of the receptacle neck to provide a fluid tight seal, an intervening circular washer of deformable material (not shown) being interposed, if desired, to insure the seal. The lower or base end of the tubular body 40 is externally charactered or ribbed as indicated at 43 so that it can be strongly gripped in screwing it onto and unscrewing it from the receptacle neck. Smaller or reduced diameter upper end of the tubular body has an internal cylindrical wall 44 which defines a passage registered and continuous with and coaxial to the passage in the receptacle neck 9. External threads 45 are provided on the smaller end of the body 40 for attachment of a closure and sealing cap 46 adapted to be easily removed and replaced; the cap 46 has external ribs 47 to improve the grip of the user in removing and replacing the cap.

Suspended from the body 40 and located within the washing chamber 1 so as to be immersed in liquid washing solution contained therein is a washing means comprising suitable soft material such as polyurethane foam capable of cleansing a lens when the latter is inserted into the washing chamber through the aligned openings of the body member 40 and the receptacle neck 9 and drawn to and fro across such washing material. Desirably the washing material comprises a pair of elongated strips 48, 49 supported by suitable means such as frame members 50, 51 suitably held or located by or, as shown, secured at their upper ends to the body member 40. The frame members are formed of stiff shape retaining material compatible with the washing solution to be used in the chamber 1; for example, they may be formed as by injection molding of polyethylene or other suitable plastic material such as that identified above for the lens holding tongs. Lower portions of the frame members are in the form of flat strips disposed in spaced generally parallel relation; they are of substantially uniform width and thickness and have confronting surfaces 52, 53 backing the foam strips or scrubbers 48, 49 respectively. Upper portions 54, 55 of the frame members are offset outwardly from and thus spaced further apart than the lower portions and have external cylindrically curved surfaces of the same radius as the internal cylindrical surface 44 of the body member 40; it is thus feasible to jig assemble the scrubber parts, securing the upper ends of the frame members to the body member 40 by a suitable cement applied to their contacting surfaces, indicated at 56 (FIG. 5).

Side edges 58, 59 of the arcuately curved frame upper portions 54, 55 are in pairs and are all parallel to one another, adjacent edges of the two frame members being disposed in spaced confronting relation to one another and constituting guide pairs which orient the carrier tongs (and the lens carried thereby) in predetermined relation to the scrubber frame and to the soft scrubbers 48, 49 when the tongs is inserted into the washing chamber 1 through the axial opening in the tubular scrubber body 40. Guiding of the tongs and a lens carried thereby into the washway between the scrubber is effected by the converging edges of triangular reinforcing fillets 57 integrally molded with the frame parts 50, 51 and located in the angles between the arcuately curved upper portions 54, 55 and the connecting portions which join the upper frame portions to the lower frame portions.

As shown to advantage in FIG. 5, the soft sponge or foam rubbery material scrubbers 48, 49 normally contact one another on and along the longitudinal axis of the scrubber, the surfaces being in contact along the line indicated at 60. Thus the scrubbers provide or define a washway into which a lens 36 is inserted while held by its periphery in the carrier tongs. The scrubbers 48, 49 are of uniform width along their length, such width being approximately equal to or slightly greater than the diameter of the lens 36, as shown in FIG. 3, so that the entire areas of both sides of the lens can be efficiently washed simultaneously by to and fro motion along the washway. Such motion is imparted to the lens by alternately lowering and raising the inserted tongs relative to the scrubber assembly.

The soft foam scrubbers 48, 49 may be conveniently shaped as identical strips of uniform rectangular section with opposite side notches adjacent their ends. They are suitably secured in place on the frame members 50, 51 as by being cemented to the confronting frame surfaces 52, 53 or as shown and in lieu of such cementing or in addition thereto, the top and bottom ends of the foam scrubbers may be bent laterally and inserted into and through vertically spaced openings 61, 62 provided in the frame members, the notches in the scrubber strips providing interlocks locating and holding the strips in predetermined positions relative to the frame means. The scrubber material is compressed in forcing it through the openings 61, 62, the inherent resiliency of such material retaining it in frictional engagement with the walls of the openings and also causing it to spring back to its molded shape to provide the mechanical interlocks mentioned which result from the expansion of the end portions of the foam material that project through the openings and beyond the frame members. Moreover, the frame members are formed in molding with fine needle-like teeth (not shown) some of which project into the openings 61 and on which the foam scrubbers are impaled to secure the scrubbers against shifting and dislodgement in use. Thus it is easy to remove and replace the soft foam scrubbers 48, 49 by reason of the interlocks described, the removal and replacement of such scrubbers being further facilitated, if desired, by omitting adhesion agent between them and the frame members.

Cups 65 provide for storage of contact lenses when not in use. These cups are snap fitted for facile removal and replacement against flat outside surfaces 66, 67 of the lower portions on either the tongs or the scrubber frame; of the frame members 50, 51, are molded or otherwise formed of any suitable material such as a plastic which may be of the same type as that used in making the frame members 50, 51 or the tongs. It is feasible to make the cups, together with the frame members, body 40, tongs and caps 12, 46 in a single operation using a family mold and the same plastic material for all such parts.

The snap fit interlock of each of the cups to the frame members on which it is mounted is achieved by a pair of arms 68 which project in parallel relation from diametrically opposite points of the cup, the arms being received normal to the plane of the cup opening and received in locating notches 69 formed in opposite edges 70 of the frame members 50, 51. The distal ends of the arms 68 are formed with detent knobs or shoulders which snap behind the frame members 50, 51 in assembling the cups to the frame, the width of the frame members between the notches 69 being slightly greater than the distance between the detents on the arms 68 so as to spring the cup arms apart slightly in such assembly. The space in the hollow of each of the cups 65, is sufficient to accommodate a contact lens 66, the latter being encapsulated in a chamber defined by the cup and the flat outer wall of the frame member.

Attachment of the encapsulating cups to the scrubber as shown in the illustrative embodiment of the invention has the advantage of keeping the lenses immersed in the cleansing solution when not in use.

Removal of the scrubber assembly as a unit from the cleansing solution chamber affords ready access to the encapsulating cups to retrieve the lenses for use. Rinsing of a lens after such storage and prior to use is achieved by first removing the lenses from the cups and immersing the lenses one at a time in the rinsing solution while held by the tongs in the manner described above, or, if desired, by immersing the scrubber assembly including the storage cups and the lenses contained therein bodily into any suitable rinsing solution such as that in the rinsing chamber 2.

According to a modified design the body portion of each of the scrubber sponges 48, 49 is wider than the flat frame member 50 or 51 to which it is applied and has integral relatively narrow elongated end portions which are received through the rectangular openings 61, 62 of the frame member. The parts of such narrow end portions which project through the frame openings are disposed flat-wise against the rear surfaces 66, 67 of the frame members and are received under the edges of the removable cups 65 which thus constitute holding clips that clamp the narrow ends of the sponge scrubbers against the rear faces of the frame members to prevent dislodgement of the scrubbers during the lens washing operation. Further to prevent shifting of the body portions of the foam sponge scrubbers 48, 49, some of the needlelike teeth mentioned may be formed on the inner confronting faces 52, 53 of the frame members. The body portions of the scrubbers are thus impaled on thin hairlike needles or teeth, the needles each being of less length than the effective thickness of the compressed foam scrubber held thereby to prevent the needles projecting through the scrubbers and scratching a lens.

In a further refinement of the polyurethane scrubber sponges they are formed with sawtooth cross-sectional profiles. The rear surface of each of the scrubber members 48, 49 is flat for engagement against the associated one of the flat surfaces 52, 53 of the frame members; the front surfaces of the scrubber are each of wave form, presenting undulations or ridges which extend in parallel relation to one another and transversely to the body portion of the scrubber member. Thus the undulations or ridges are also transverse to the path of the lens and have a wiping or stroking action against the relatively moving lens surfaces which achieves improved cleansing. Moreover, the ridges of one such scrubber member may be interfitted with the ridges of the confronting companion member in mating relation further to improve the cleansing action.

When a contact lens is removed by the wearer and is to be stored in the kit of the present invention, the scrubber assembly is removed as a unit from the washing chamber 1 by unscrewing the body 40 from the stem 9. One of the cups 65 is then removed from the frame member with which it is normally interlocked, the contact lens is placed in the hollow of the removed cup and the cup is reapplied against the frame member with the cup arms 68 received interlockingly in the notches 69 and with the detents on such arms retaining the interlocked relation.

As shown in FIGS. 2 and 7 the cups 65 are located wholly between parallel planes defined by the side edges 70 of the frame members 50, 51. Thus is minimized the possibility of the cups 65 being dislodged by engagement with the neck of the receptacle while being inserted into or withdrawn from the washing chamber. Suitable means such as edge notches in the cups or holes 71 in the frame members 50, 51 is provided for venting and draining the lens storage chambers.

A lens is removed from the grip of the tongs by applying squeezing pressure to the portions of the legs 18, 19 located between the fulcrum 26 and the base 16, as, for example, along the lines 24, 25 the squeezing together in such zone actuating the tongs to swing the holding portions 20, 21 away from one another so as to release the lens.

The invention thus provides a compact kit for storing and cleaning small fragile articles such as contact lenses. The carrier tongs grips a lens by its peripheral margin, and, so held, the lens can be readily manipulated as for insertion into the washway between the foam rubber washers or sponges 48, 49, immersed in the cleansing liquid or detergent solution contained in receptacle chamber 1, and for accomplishing cleansing action as by imparting to and fro movement to the lens relative to the scrubber assembly.

In accordance with the patent statutes, the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration of the best known mode of practicing the invention and without intending to limit the scope of the claims to the specific details disclosed.

What I claim and desire to secure by Letters Patent of the United States is:

1. A holding device for a lens or the like having a thin circular periphery,
   said device comprising handle means adapted to be grasped in manipulating the device,
   a pair of resilient deformable legs extending from the handle means in side by side generally spaced relation,
   the legs having near ends attached to the handle means at spaced points and distal ends formed with gripping portions which first diverge and then converge to define a lens receiving zone substantially surrounded by such gripping portions, and means carried by the legs at a point intermediate the handle means and the gripping portions providing a fulcrum limiting movement of the legs toward one another at such intermediate point,
   the legs being adapted, when squeezed toward one another in a region intermediate the handle means and the fulcrum, to pivot about the fulcrum and swing the gripping portions apart for receiving a lens between them, the legs being further adapted, when relieved of such squeeze, to return by inherent resiliency toward their normal condition and grip and substantially surround a received lens.

2. A holding device as defined in claim 1 in which each leg progressively decreases in cross section from its near to its distal end.

3. A holding device as defined in claim 1 in which the legs are integrally united at their near ends and each leg progressively decreases in cross section from its near to its distal end.

4. A holding device as defined in claim 1 in which the legs in their unstressed condition converge toward the gripping portions.

5. A holding device as defined in claim 4 in which the convergent legs each progressively decreases in cross section, being of substantially uniform thickness and tapered in width from its near to its distal end.

6. A holding device as defined in claim 1 in which each leg is of substantially uniform thickness and is tapered in width from its near to its distal end.

7. A holding device as defined in claim 1 in which the fulcrum means comprises a post of relatively thin section extending between and integrally connecting the legs.

8. A holding device as defined in claim 7 comprising a base member, the near ends of the legs being rigidly secured to the base member and thereby restrained against twisting whereby to protect the fulcrum post against excessive distortion.

9. A holding device as defined in claim 1 in which one of the legs is formed with an integral projection at a point intermediate its near end and the fulcrum point, such projection being directed toward and adapted to bear against the other leg in resisting excessive squeeze pressure.

10. A holding device as defined in claim 1 in which the gripping portions of the legs are formed with integral protuberances projecting toward the central portion of the lens receiving zone, such protuberances being adapted for gripping engagement with the periphery of a received lens at circumferentially spaced points of the latter cooperatively to hold the lens with its periphery in predetermined spaced relation to the gripping portions.

11. A holding device as defined in claim 10 in which the protuberances on the gripping portions are arranged in pairs, the protuberances of each pair confronting one another and being adapted to receive between them the peripheral edge of a gripped lens.

12. A holding device as defined in claim 1 in which the gripping portion of at least one of the legs is arcuately curved.

13. A holding device as defined in claim 1 in which the gripping portions are each arcuately curved, substantially semi-circular in extent and disposed in a common plane containing the axis of the device.

14. A kit for cleaning a small fragile article such as a contact lens,
said kit comprising receptacle means providing a chamber for containing a cleansing liquid,
said means having a neck providing an opening into the chamber,
a scrubber assembly mounted on the neck and comprising a body member disposed outside the chamber and an internal frame member fast to the body member and extending therefrom into the chamber,
a relatively soft deformable washing element carried by the internal frame member within the chamber so as to be immersed in contained liquid,
said element having a working surface for engagement by an article to be washed,
a holder comprising a handle and a tongs extending from the handle,
the tongs having complemental legs formed with distal ends adapted to coact in gripping between them an article to be cleansed,
the scrubber body being formed with a central through opening aligned with the neck opening and adapted to receive the tongs inserted endwise therethrough in introducing a gripped article into the chamber,
the scrubber body being engageable with the tongs to guide the latter along a predetermined path during endwise reciprocation of the holder relative to the scrubber in drawing the gripped article to and fro across the face of the washing element in predetermined relation.

15. A kit as defined in claim 14 in which the scrubber body and the neck of the receptacle are formed with complemental threads adapted readily to engage and disengage one another in securing the scrubber assembly to and disconnecting it from the receptacle, the internal element and the washing element of the disconnected assembly being bodily removable from the chamber by withdrawal through the neck of the receptacle for access to the chamber in retrieving an article dislodged from the tongs.

16. A kit for cleaning a small fragile article such as a contact lens, said kit comprising receptacle means providing separate chambers for containing cleaning and rinsing liquids, said means having necks providing openings into the chambers, a holder for carrying an article to be cleansed, said holder comprising handle means removably mounted on one of the necks, a tongs fast to the handle means and comprising a pair of legs extending through the opening in said one neck and into one of the chambers, said legs being deformable to receive a lens between them and being resilient to yieldingly grip a received lens, a scrubber assembly comprising a body member mounted on another of the necks and a frame member fast to the body member and extending into another of the chambers, a relatively soft deformable washing element carried by the frame member within said other chamber so as to be immersed in liquid cleansing solution contained in such other chamber, the tongs being receivable through the mounted body member to insert a gripped lens into said other chamber for drawing such lens to and fro across the immersed washing element.

17. A kit for storing and cleaning small fragile articles such as contact lenses and the like, said kit comprising receptacle means providing separate chambers for containing cleaning and rinsing liquids, said means having necks providing openings into the chambers, a lens holder removably mounted on one of the necks, said holder comprising closure means adapted to seal the opening in the one neck, a carrier fast to the closure means and comprising leg means extending through the opening in said one neck and into one of the chambers, a scrubber assembly mounted on another of the necks and comprising a body member disposed outside the receptacle and a pair of frame members fast to the body member and extending therefrom into another of the chambers in spaced generally parallel relation, soft deformable washing means carried by the frame members within said other chamber so as to be immersed in liquid cleansing solution contained in such other chamber, such washing means comprising opposed confronting contacting elements defining the locus of an elongated washway aligned with the opening in said other neck, the body member and said other neck being formed with interfitting threads for facile removal and replacement of the scrubber assembly as a unit from and onto said other neck, the body member being formed with a through opening aligned with the washway, said leg means being adapted to grip a lens, and the carrier, upon removal of the lens holder from said one neck, being insertable into said other chamber through the openings in the body member and said other neck to carry a lens gripped by the leg means axially along the washway in simultaneous deforming contact with the confronting washing elements for scrubbing both sides of the lens at once.

18. A kit as defined in claim 14 for cleaning an article such as a lens in which the tongs is elongated with the legs disposed on opposite sides of its longitudinal axis and in which the tongs has a dimension transverse to the axis which progressively increases from the distal ends of the legs toward the handle whereby in guiding the tongs the scrubber body member progressively more closely confines the tongs as the latter is inserted into the through opening.

19. A kit as defined in claim 14 which includes lens storage means on and wholly supported by the scrubber assembly, said storage means comprising cup means formed and adapted to contain a lens, and the cup means having resilient elements making snap fit engagement with the scrubber assembly to hold the cup means and the scrubber assembly together by an easily released interlock.

20. A kit as defined in claim 19 in which the cup means is disposed wholly outside the path of the tongs to prevent the cup means being engaged by an article so drawn across the washing element.

21. A kit as defined in claim 15 which includes lens storage means on and wholly supported by the scrubber assembly, said storage means comprising cup means formed and adapted to contain a lens, and the cup means having resilient elements making snap fit engagement with the scrubber assembly to hold the cup means and the scrubber assembly together by an easily released interlock, and the profile of the scrubber assembly together with the interlocked cup means being smaller than the neck opening to permit withdrawal of the interlocked cup means and scrubber assembly as a unit in said bodily removal of the disconnected assembly from the chamber.

22. A holding device for a lens or similar disc-like object having a thin periphery, said device comprising handle means adapted to be grasped for manipulating the device, leg means including a pair of resilient deformable legs attached to and extending from the handle means in side by side relation and disposed on opposite sides of and defining the longitudinal axis of the device, the legs each having a near end rigidly attached to the handle means and a distal lens gripping end, said leg means being adapted to be readily deformed to swing the lens gripping ends of the legs away from one another, said distal leg ends normally being spaced from one another on opposite sides of said axis and when so swung apart defining between them a lens receiving zone substantially surrounded by said lens gripping ends, one of said leg ends including a portion having a contour complemental to the periphery of a lens to be held in the device and a relatively long dimension parallel to the axis, said leg means being further adapted to return by inherent resiliency toward normal with the distal ends of the legs yieldingly gripping a received lens, said leg end portion being formed to straddle and engage circumferentially spaced portions of the periphery of a received lens in the provision of an interlock to prevent lateral displacement of the lens from said zone, and said leg end portion being relatively thin transversely to its long dimension thereby providing substantially unobstructed access across such end portion to the surfaces of a lens received between and gripped by the distal leg ends.

23. A holding device as defined in claim 22 in which the near ends of said legs are thick relative to their distal ends and the legs progressively decrease in cross section toward their distal ends.

24. A holding device as defined in claim 22 in which said lens straddling and engaging ends of the legs comprise integral formations projecting into the lens receiving zone.

25. A holding device as defined in claim 22 in which the leg end portion lies in an axial plane.

26. A holding device as defined in claim 22 in which the leg end portion has an inside face directed toward the lens receiving zone and formed with a longitudinally extending groove adapted to receive the periphery of a lens gripped between the leg ends.

27. In a device for use in cleaning a contact lens or the like, comprising a receptacle adapted to contain a cleansing liquid and a scrubber carried by the receptacle, the receptacle having a neck defining a circular access opening, the scrubber including a body having a through opening and being formed with means and adapted for attachment to the receptacle in rigid relation and with the through opening aligned with the access opening and continuous with the interior of the receptacle, frame means rigidly attached to the body and comprising spaced confronting members defining between them a guideway aligned and continuous with the access opening, said frame means including a portion of arcuate profile extending through the access opening in closely fitting relation to the neck, the frame means being held by the body in predetermined relation to the receptacle, and relatively soft deformable means carried by the frame means and disposed in the guideway, said deformable means having lens contacting opposed surfaces providing a washway and adapted for wiping engagement with a lens moved longitudinally in the washway.

28. In a device for use in cleaning a contact lens or the like comprising a receptacle adapted to contain a cleansing liquid and a scrubber carried by the receptacle, the receptacle having an access opening, the scrubber including a body having a through opening and being formed and adapted for attachment to the receptacle over the access opening in rigid relation and with the through opening continuous with the interior of the receptacle, frame means rigidly attached to the body extending through the access opening into the receptacle and held by the body in predetermined relation to the receptacle, said frame means comprising spaced confronting members defining between them an elongated guideway aligned and continuous with the access opening, and relatively soft deformable means carried by the frame means and disposed in the guideway, said deformable means having lens contacting opposed surfaces providing a washway and adapted for wiping engagement with a lens moved longitudinally in the washway.

29. In a lens cleaning device as defined in claim 28, the frame members each extending into the through opening of the body and being directly secured to the latter.

30. In a lens cleaning device as defined in claim 28, the confronting frame members having relatively closely spaced portions distal to the body defining a narrow guideway portion, the frame means having relatively widely spaced portions adjacent to the body defining a wide guideway portion, and the frame means including guide elements inclined to the axis of the guideway for engaging a lens being inserted into the guideway through the body opening and guiding such lens in its movement from said wide portion of the guideway into said narrow portion thereof.

31. In a lens cleaning device as defined in claim 28, the body being tubular and in threaded engagement with the receptacle for facile removal of the scrubber from and replacement on the receptacle.

32. In a lens cleaning device as defined in claim 28, the body being tubular and said through opening being generally circular in cross section, and the frame members having portions extending into the through opening of the body and secured to the latter in diametrical relation.

33. In a lens cleaning device as defined in claim 28, the body being tubular, a closure cap detachably mounted on the body and constituting a seal for the through opening, and the body and the cap constituting a seal for the access opening of the receptacle.

34. A scrubber device insertable into and attachable to the neck of a bottle or other receptacle containing a cleansing solution for use in cleaning a lens or the like,
    said device comprising a body member,
    a pair of elongated rigid frame members rigidly attached to the body member and extending there from in spaced generally parallel relation, the body member being adapted for attachment to the neck of such a receptacle with the frame members disposed inside the receptacle, the body member being formed with a through opening aligned axially with the space between the members to permit insertion of a lens into said space through the neck of a receptacle to which the body is attached, relatively soft deformable means carried by the frame members and providing between such frame members a guideway for an inserted lens, the deformable means having portions on opposite sides of the guideway for simultaneous contact of the deformable means with both sides of such lens, lens storage means comprising an open cup into which a lens may be received, said cup being receivable against one of the frame members in predetermined relative position with such frame member disposed across the cup opening to confine a received lens within the cup, and the cup and the one frame member having interlocking snap fit formations locating and holding the cup in said predetermined position for facile removal and replacement.

References Cited in the file of this patent
UNITED STATES PATENTS
2,967,607    Hollinger _____ Jan. 10, 1961